(12) United States Patent
Sun et al.

(10) Patent No.: US 12,452,709 B2
(45) Date of Patent: Oct. 21, 2025

(54) ENHANCED CSI REPORTING FOR MULTI-TRP OPERATION

(71) Applicant: APPLE INC., Cupertino, CA (US)

(72) Inventors: Haitong Sun, Cupertino, CA (US); Chunxuan Ye, San Diego, CA (US); Dawei Zhang, Saratoga, CA (US); Ismael Gutierrez Gonzalez, San Jose, CA (US); Wei Zeng, Saratoga, CA (US); Weidong Yang, San Diego, CA (US); Yeong-Sun Hwang, Germering (DE); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,292

(22) PCT Filed: Oct. 1, 2021

(86) PCT No.: PCT/CN2021/122493
§ 371 (c)(1),
(2) Date: Aug. 30, 2022

(87) PCT Pub. No.: WO2023/050449
PCT Pub. Date: Apr. 6, 2023

(65) Prior Publication Data
US 2024/0236724 A1    Jul. 11, 2024

(51) Int. Cl.
*H04W 24/08*    (2009.01)
*H04B 7/024*    (2017.01)
(Continued)

(52) U.S. Cl.
CPC ............ *H04W 24/08* (2013.01); *H04B 7/024* (2013.01); *H04B 7/0486* (2013.01); *H04B 7/0626* (2013.01)

(58) Field of Classification Search
CPC .... H04B 7/024; H04B 7/0481; H04B 7/0486; H04B 7/0626; H04L 25/03904;
(Continued)

(56) References Cited

U.S. PATENT DOCUMENTS 12,184,361 B2 * 12/2024 Gao ..................... H04B 7/0632
2020/0186207 A1    6/2020 Davydov et al.
(Continued)

FOREIGN PATENT DOCUMENTS

CN    108365939 A    8/2018

OTHER PUBLICATIONS

PCT/CN2021/122493, International Search Report and Written Opinion, Apr. 25, 2022, 9 pages.

*Primary Examiner* — Robert J Lopata
(74) *Attorney, Agent, or Firm* — Dorsey & Whitney LLP (57) ABSTRACT

Enhanced channel state information (CSI) reporting may include encoding a CSI reporting configuration associated with a first transmission and reception point (TRP) and a second TRP. The CSI reporting configuration may include at least one codebook configuration. The at least one codebook may include at least one of a rank restriction configuration or a codebook subset restriction (CBSR) configuration. The at least one of the rank restriction configuration or the CBSR configuration may correspond to at least one of a particular type of TRP measurement, a particular TRP of the first TRP or the second TRP, or channel measurement resources (CMRs) associated with at least one of the first TRP or the second TRP. A CSI measurement communication received from a user equipment (UE) may be decoded. The CSI measurement communication may be based on the decoded CSI reporting configuration.

20 Claims, 6 Drawing Sheets

(51) Int. Cl.
*H04B 7/0456* (2017.01)
*H04B 7/06* (2006.01)

(58) Field of Classification Search
CPC .... H04L 5/0035; H04L 5/0057; H04W 24/08; H04W 76/28
USPC ....................................................... 370/329
See application file for complete search history.

(56) References Cited

U.S. PATENT DOCUMENTS

| | | |
|---|---|---|
| 2021/0028843 A1 | 1/2021 | Zhou et al. |
| 2021/0105753 A1 | 4/2021 | Zhang et al. |
| 2021/0143883 A1 | 5/2021 | Yerramalli et al. |
| 2022/0141852 A1* | 5/2022 | Zhang ................. H04L 25/0202 370/329 |
| 2022/0302977 A1* | 9/2022 | Sun ...................... H04B 7/0626 |
| 2022/0321183 A1* | 10/2022 | Khoshnevisan ....... H04B 7/024 |
| 2023/0087003 A1* | 3/2023 | Hao ..................... H04L 5/0057 370/329 |
| 2024/0022303 A1* | 1/2024 | Zhang .................. H04B 7/0626 |
| 2024/0030985 A1* | 1/2024 | Yuan ................... H04B 7/0626 |

* cited by examiner

ENHANCED CSI REPORTING FOR MULTI-TRP OPERATION

TECHNICAL FIELD

This application relates generally to wireless communication systems, including channel state information (CSI) reporting.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, in 3rd Generation Partnership Project (3GPP) Release 16 (Rel-16), six different schemes have been designed for multiple transmission and reception point (Multi-TRP) operation, including: 1. Multi-downlink control information (DCI) based Multi-TRP operation; and 2. Single-DCI based Multi-TRP operation, which further includes: a. SDM Scheme: Spatial Domain Multiplexing (SDM) and single Transport Block (TB); b. FDMSchemeA: Frequency Domain Multiplexing (FDM) and single TB; c. FDMSchemeB: Frequency Domain Multiplexing and dual TB; d. TDMSchemeA: Time Domain Multiplexing (TDM) and intra-slot repetition; and e. Scheme 4: Time Domain Multiplexing and inter-slot repetition.

Despite including these schemes, Rel-16 does not include any channel state information-reference signal (CSI-RS) processing enhancement. In particular, Rel-16 does not allow for explicit interference hypothetical testing to optimize a precoder for each TRP. In addition, Rel-16 does not allow for efficient switching between single TRP and multi-TRP operation.

In 3GPP Release 17 (Rel-17), CSI enhancements have been mainly focused on Non-Coherent Joint Transmission (NCJT) for Single-DCI Multi-TRP operation. For instance, in the same CSI-ReportConfig (i.e., a CSI reporting configuration), a UE can be configured to report either a single-TRP measurement, a multi-TRP measurement, or both. In addition, for channel measurement resource (CMR) configuration, in the same CSI-RS resource set, a number of resources can be configured for a first TRP measurement, a number of resources can be configured for a second TRP measurement, and a number of pairs of resources can be configured for a multi-TRP measurement. Finally, with respect to interference measurement resources (IMRs), Zero Power (ZP) IMR (i.e., CSI-IM) may be supported while Non-Zero Power (NZP) IMR may not be supported.

The solutions provided herein relate to reducing UE complexity and power consumption for enhanced CSI reporting with respect to multi-TRP operation, including solutions related to rank restriction, Codebook Subset Restriction (CBSR), CMR/IMR time-domain restrictions, and a CSI processing timeline (i.e., Z and Z' as further described herein).

As briefly described above, the first solution provided herein is related to rank restriction. By way of background, rank restriction is configured in "CodebookConfig" within CSI-ReportConfig, in current specifications. This current procedure can reduce rank indicator (RI) hypothesis testing that a UE has to perform. In addition, for enhanced CSI reporting with respect to multi-TRP scenarios, a UE has to measure both a single TRP hypothesis and a multi-TRP hypothesis in a single CSI report, in one of the more complicated scenarios.

```
CodebookConfig ::=        SEQUENCE {
  codebookType            CHOICE {
    type1                 SEQUENCE {
      subType             CHOICE {
        typeI-SinglePanel   SEQUENCE {
          nrOfAntennaPorts  CHOICE {
            two               SEQUENCE {
              twoTX-CodebookSubsetRestriction  BIT STRING (SIZE (6))
            }
            moreThanTwo       SEQUENCE {
              n1-n2             CHOICE {
                two-one-TypeI-SinglePanel-Restriction      BIT STRING (SIZE (8)),
                two-two-TypeI-SinglePanel-Restriction      BIT STRING (SIZE (64)),
                four-one-TypeI-SinglePanel-Restriction     BIT STRING (SIZE (16)),
                three-two-TypeI-SinglePanel-Restriction    BIT STRING (SIZE (96)),
                six-one-TypeI-SinglePanel-Restriction      BIT STRING (SIZE (24)),
                four-two-TypeI-SinglePanel-Restriction     BIT STRING (SIZE (128)),
                eight-one-TypeI-SinglePanel-Restriction    BIT STRING (SIZE (32)),
                four-three-TypeI-SinglePanel-Restriction   BIT STRING (SIZE (192)),
                six-two-TypeI-SinglePanel-Restriction      BIT STRING (SIZE (192)),
                twelve-one-TypeI-SinglePanel-Restriction   BIT STRING (SIZE (48)),
                four-four-TypeI-SinglePanel-Restriction    BIT STRING (SIZE (256)),
                eight-two-TypeI-SinglePanel-Restriction    BIT STRING (SIZE (256)),
                sixteen-one-TypeI-SinglePanel-Restriction  BIT STRING (SIZE (64))
              },
              typeI-SinglePanel-codebookSubsetRestriction-12 BIT STRING (SIZE (16))
            }
          },
          typeI-SinglePanel-ri-Restriction  BIT STRING (SIZE (8))
```

The first solution regarding rank restriction may include various options and sub-options. For instance, in a first option for enhanced CSI reporting for multi-TRP, rank restriction may be configured in CodebookConfig in CSI-ReportConfig, with the following restrictions (or sub-options): a. A single CodebookConfig within a single CSI-ReportConfig may apply to all possible hypotheses (i.e., each CSI-ReportConfig may include a single CodebookConfig that all applies to all hypothesis testing), including a single-TRP measurement for the first TRP, a single-TRP measurement for the second TRP, and a multi-TRP measurement for both TRP; b. In a single CSI-ReportConfig, a different CodebookConfig can be configured for each different TRP. For instance, a first CodebookConfig may be configured for a first TRP and a second CodebookConfig may be configured for a second TRP; and c. In a single CSI-ReportConfig, a different CodebookConfig can be configured for single-TRP measurements and multi-TRP measurements. For example, a first CodebookConfig may be configured for single-TRP measurements and a second CodebookConfig may be configured for multi-TRP measurements.

In a second option regarding rank restriction, for enhanced CSI reporting related multi-TRP, when the rank restriction is configured in CodebookConfig within a CSI-ReportConfig, the following sub-options may apply: a. A single rank restriction can be configured, which rank restriction may apply to all TRPs in all possible hypothesis testing including a single-TRP measurement for a first TRP, a single-TRP measurement for a second TRP, and a multi-TRP measurement for both TRP; b. In a single CodebookConfig within CSI-ReportConfig, different rank restrictions can be configured for different TRPs. For instance, one rank restriction may be configured for a first TRP and a second rank restriction may be configured for a second TRP; c. In a single CodebookConfig within CSI-ReportConfig, different rank restrictions can be configured for single-TRP measurements and multi-TRP measurements. For instance, a first rank restriction of a given CodebookConfig may be configured for single-TRP measurements and a second rank restriction of the given CodebookConfig may be configured for multi-TRP measurements.

In a third option regarding rank restriction (and CMR configuration), for enhanced CSI reporting for multi-TRP scenarios, rank restrictions can be configured per set of CMRs. In particular, a maximum of three sets of CMRs may be utilized under this solution. For instance, a first set may comprise one or more CMRs for single-TRP measurements associated with a first TRP, a second set may comprise one or more CMRs for single-TRP measurements associated with a second TRP, and a third set may comprise one or more pairs of CMRs for the multi-TRP measurements associated with both the first and second TRPs.

In a fourth option regarding rank restriction (and CMR configuration), for enhanced CSI reporting for multi-TRP, when rank restrictions are configured per set of CMR(s), the following sub-options may apply: a. Different rank restrictions have to be configured between single-TRP and multi-TRP measurements, (i.e., same rank restriction can be used for sets 1/2 described above, and different rank restrictions between sets 1/2 and set 3 described above); or b. Different rank restrictions can be configured for any of sets 1, 2, and/or 3 of the CMR(s).

In a fifth option regarding rank restriction (and CMR configuration), for enhanced CSI reporting for multi-TRP measurement associated with a pair of CMR resources, the following sub-options may apply: a. A single total rank restriction applies to all pairs of CMRs. For instance, a total number of PDSCH layers (e.g., rank<=4)): b. A rank restriction applies to both CMRs in any given pair (e.g., both the first CMR and the second CMR in a pair of CMR resources), but may be different between different pairs of CMRs. In other words, if two pairs of CMRs are being used, the first pair of CMRs may have a first corresponding rank restriction (i.e., the first rank restriction applies to both CMRs of the first pair) and the second pair of CMRs may have a second, different corresponding rank restriction (i.e., the second rank restriction applies to both CMRs of the second pair). For instance, a number of PDSCH layers (e.g., rank from each TRP<=2); and c. A different rank restriction can be configured for each CMR regardless of CMR pairs.

In a sixth option regarding rank restriction (and CMR configuration), for enhanced CSI reporting for multi-TRP measurement (i.e., measurement associated with a pair of CMR resources), when different rank restrictions can be configured for each TRP, the following sub-options may apply: a. Different rank restrictions are independently encoded. For example, {1,2} for the first TRP and {1, 2} for the second TRP; and b. Different rank restrictions are jointly encoded. In an example, {(1,1),(1,2),(2,1),(2,2)} for both TRPs. In another example, {(1,1),(2,2)} for both TRPs.

As briefly described above, a second solution may be related to a Codebook Subset Restriction (CBSR). By way of background, in the current specification, CBSR is configured in CodebookConfig within the CSI-ReportConfig. Such procedures may reduce precoding matrix indicator (PMI) hypothesis testing that a UE has to perform. In addition, for enhanced CSI reporting for multi-TRP, a UE has to measure both the single TRP and multi-TRP hypothesis in a single CSI report, in the most complicated case.

that all applies to all hypothesis testing), including a single-TRP measurement for the first TRP, a single-TRP measurement for the second TRP, and a multi-TRP measurement for both TRP; b. In a single CSI-ReportConfig, a different CodebookConfig can be configured for each different TRP. For instance, a first CodebookConfig may be configured for a first TRP and a second CodebookConfig may be configured for a second TRP: and c. In a single CSI-ReportConfig, a different CodebookConfig can be configured for single-TRP measurements and multi-TRP measurements. For example, a first CodebookConfig may be configured for single-TRP measurements and a second CodebookConfig may be configured for multi-TRP measurements.

In a second option regarding CBSR, for enhanced CSI reporting related multi-TRP, when the CBSR is configured in CodebookConfig within a CSI-ReportConfig, the following sub-options may apply: a. A single CBSR can be configured, which CBSR may apply to all TRPs in all possible hypothesis testing including a single-TRP measurement for a first TRP, a single-TRP measurement for a second TRP, and a multi-TRP measurement for both TRP: b. In a single CodebookConfig within CSI-ReportConfig, different CBSRs can be configured for different TRPs. For instance, one CBSR may be configured for a first TRP and a second CBSR may be configured for a second TRP; c. In a single CodebookConfig within CSI-ReportConfig, different CBSRs can be configured for single-TRP measurements and multi-TRP measurements. For instance, a first CBSR of a given CodebookConfig may be configured for single-TRP

```
CodebookConfig ::=          SEQUENCE {
    codebookType              CHOICE {
        type1                   SEQUENCE {
            subType               CHOICE {
                typeI-SinglePanel   SEQUENCE {
                    nrOfAntennaPorts   CHOICE {
                        two              SEQUENCE {
                            twoTX-CodebookSubsetRestriction   BIT STRING (SIZE (6))
                        },
                        moreThanTwo      SEQUENCE {
                            n1-n2          CHOICE {
                                two-one-TypeI-SinglePanel-Restriction      BIT STRING (SIZE (8)),
                                two-two-TypeI-SinglePanel-Restriction      BIT STRING (SIZE (64)),
                                four-one-TypeI-SinglePanel-Restriction     BIT STRING (SIZE (16)),
                                three-two-TypeI-SinglePanel-Restriction    BIT STRING (SIZE (96)),
                                six-one-TypeI-SinglePanel-Restriction      BIT STRING (SIZE (24)),
                                four-two-TypeI-SinglePanel-Restriction     BIT STRING (SIZE (128)),
                                eight-one-TypeI-SinglePanel-Restriction    BIT STRING (SIZE (32)),
                                four-three-TypeI-SinglePanel-Restriction   BIT STRING (SIZE (192)),
                                six-two-TypeI-SinglePanel-Restriction      BIT STRING (SIZE (192)),
                                twelve-one-TypeI-SinglePanel-Restriction   BIT STRING (SIZE (48)),
                                four-four-TypeI-SinglePanel-Restriction    BIT STRING (SIZE (256)),
                                eight-two-TypeI-SinglePanel-Restriction    BIT STRING (SIZE (256)),
                                sixteen-one-TypeI-SinglePanel-Restriction  BIT STRING (SIZE (64))
                            },
                            typeI-SinglePanel-codebookSubsetRestriction-12 BIT STRING (SIZE (16))
                        }
                    },
                    typeI-SinglePanel-ri-Restriction   BIT STRING (SIZE (8))
```

The first solution regarding CBSR configuration may include various options and sub-options. For instance, in a first option for enhanced CSI reporting for multi-TRP, CBSR may be configured in CodebookConfig in CSI-ReportConfig, with the following restrictions (or sub-options): a. A single CodebookConfig within a single CSI-ReportConfig may apply to all possible hypotheses (i.e., each CSI-ReportConfig may include a single CodebookConfig measurements and a second CBSR of the given CodebookConfig may be configured for multi-TRP measurements.

In a third option regarding CBSR (and CMR configuration), for enhanced CSI reporting for multi-TRP scenarios, CBSRs can be configured per set of CMRs. In particular, a maximum of three sets of CMRs may be utilized under this solution. For instance, a first set may comprise one or more CMRs for single-TRP measurements associated with a first TRP, a second set may comprise one or more CMRs for single-TRP measurements associated with a second TRP, and a third set may comprise one or more pairs of CMRs for the multi-TRP measurements associated with both the first and second TRPs.

In a fourth option regarding CBSR (and CMR configuration), for enhanced CSI reporting for multi-TRP, when CBSR are configured per set of CMR(s), the following sub-options may apply: a. Different CBSR have to be configured between single-TRP and multi-TRP measurements, (i.e., a same CBSR can be used for sets 1/2 described above, and different CBSRs between sets 1/2 and set 3 described above): or b. Different CBSRs can be configured for any of sets 1, 2, and/or 3 of the CMR(s).

In a fifth option regarding CBSR (and CMR configuration), for enhanced CSI reporting for multi-TRP measurement associated with a pair of CMR resources, the following sub-options may apply: a. A single total CBSR applies to all pairs of CMRs. For instance, a total number of PDSCH layers; b. A CBSR applies to both CMRs in any given pair (e.g., both the first CMR and the second CMR in a pair of CMR resources), but may be different between different pairs of CMRs. In other words, if two pairs of CMRs are being used, the first pair of CMRs may have a first corresponding CBSR (i.e., the first CBSR applies to both CMRs of the first pair) and the second pair of CMRs may have a second, different corresponding CBSR (i.e., the second CBSR applies to both CMRs of the second pair). For instance, a number of PDSCH layers; and c. A different CBSR can be configured for each CMR regardless of CMR pairs.

As briefly described above, a third solution may be related to CMR/IMR time-domain restrictions, which solution may include various options and sub-options. For instance, a first option for CSI reporting may include the following restrictions in order to reduce UE processing complexity and memory usage: a. For a same CSI measurement, a UE may be expected to receive all CMRs during a single connected mode discontinuous reception (CDRX) active time; b. For a same CSI measurement, a UE may be expected to receive all IMRs during a single CDRX active time; and/or c. For a same CSI measurement, a UE may be expected to receive all CMRs and IMRs during a single CDRX active time.

Figure 1:
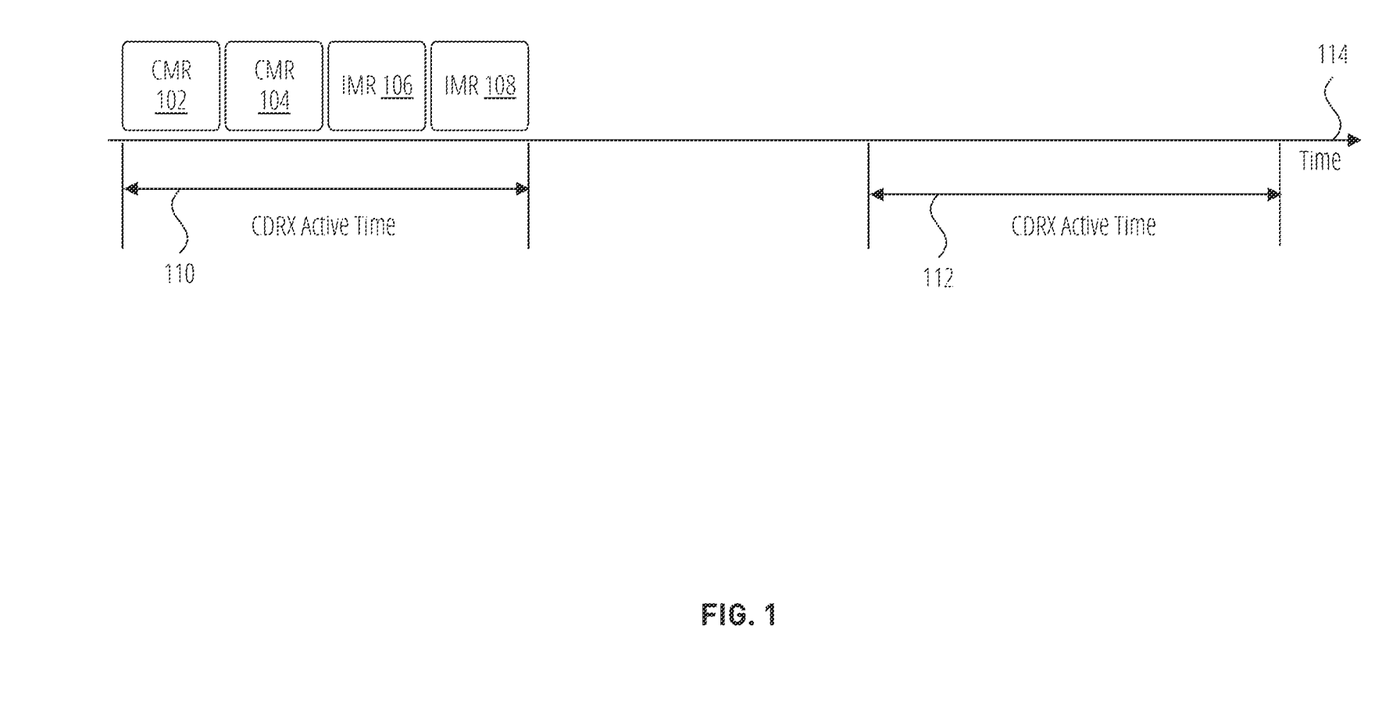
FIG. 1 illustrates a timeline with periodic CDRX active time in accordance with one embodiment.

For instance, FIG. 1 illustrates a timeline 114 having two CDRX active time periods, including CDRX active time 110 and CDRX active time 112. As illustrated, each CMR and IMR may be received by a UE within a single CDRX active time period. In particular, each CMR (i.e., CMR 102 and CMR 104) and each IMR (i.e., IMR 106 and IMR 108) may be received within the CDRX active time 110 while none are received during CDRX active time 112. Notably, the example of FIG. 1 may comprise the option c above (i.e., the UE being expect to receive all CMRs and IMRs during a single CDRX active time, although options a and b are not mutually exclusive with respect to option c).

In a second option for CSI reporting, a UE can report, as capability, whether the UE has CMR/IMR time domain restrictions. In particular, when a UE has such restrictions, a corresponding base station (e.g., a gNB) may not configure CMR/IMR in different CDRX active time periods for a single CSI measurement.

As briefly described above, a fourth solution may be related to a CSI processing timeline (i.e., Z and Z'). By way of background, in the current specification, the minimum processing timeline is specified as Z and Z' in 3GPP Technical Specification (TS) 38.614 for aperiodic CSI processing. In particular, Z comprises a time offset between an end of a physical downlink control channel (PDCCH) that triggers aperiodic-CSI (AP-CSI) and beginning of a physical uplink shared channel (PUSCH) that carries AP-CSI while Z' is a time offset between an end of reference signals and beginning of a PUSCH that carries AP-CSI.

Notably, there are four types of Z and Z', one for low latency CSI processing, as illustrated in Table 1 (see 3GPP TS 38.514 Table 5.4-1) below and three for regular CSI processing, as illustrated in Table 2 (see 3GPP TS 38.514 Table 5.4-2) below.

TABLE 1

| | $Z_1$ [symbols] | |
| μ | $Z_1$ | $Z'_1$ |
| --- | --- | --- |
| 0 | 10 | 8 |
| 1 | 13 | 11 |
| 2 | 25 | 21 |
| 3 | 43 | 36 |

TABLE 2

| | $Z_1$ [symbols] | | $Z_2$ [symbols] | | $Z_3$ [symbols] | |
| μ | $Z_1$ | $Z'_1$ | $Z_2$ | $Z'_2$ | $Z_3$ | $Z'_3$ |
| --- | --- | --- | --- | --- | --- | --- |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

In a first option related to the CSI processing timeline, for enhanced CSI reporting with respect to multi-TRP, Table 3 (as shown below) may be adopted. Notably, Table 3 is the same as the second column (i.e., the $Z_2$ symbols).

TABLE 3

| $Z_2$ [symbols] | |
| $Z_2$ | $Z'_2$ |
| --- | --- |
| 40 | 37 |
| 72 | 69 |
| 141 | 140 |
| 152 | 140 |

In a second option related to the CSI processing timeline, for enhanced CSI reporting for multi-TRP, a UE can report the applicable Z and Z' values as a UE capability. In such embodiments, reporting may be performed in the form of symbols (i.e., symbols as units). In addition, reporting may be performed for different Sub-Carrier Spacing (SCS), where the SCS is defined as the minimum SCS among PDCCH that triggers AP-CSI, PUSCH that carries AP-CSI, and all the resource signals that are used for AP-CSI measurements.

Figure 2:
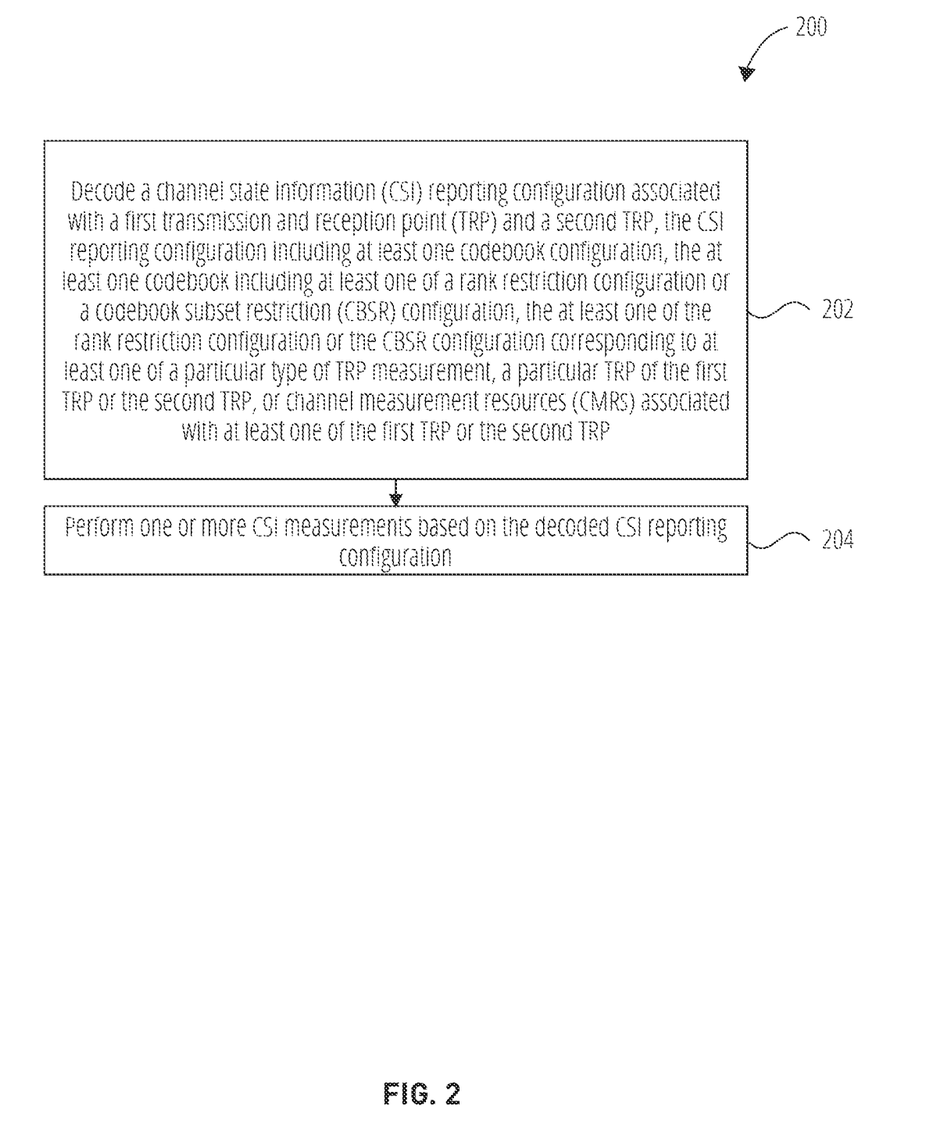
FIG. 2 illustrates a flowchart of a method for CSI reporting in accordance with one embodiment.

FIG. 2 illustrates a flowchart of a method 200 for enhanced CSI reporting. In block 202, the method 200 decodes a channel state information (CSI) reporting configuration associated with a first transmission and reception point (TRP) and a second TRP. The CSI reporting configuration may include at least one codebook configuration. For instance, the codebook configuration may comprise CodebookConfig within CSI-ReportConfig. The at least one codebook may include at least one of a rank restriction configuration or a codebook subset restriction (CBSR) configuration.

The at least one of the rank restriction configuration or the CBSR configuration may correspond to at least one of a particular type of TRP measurement, a particular TRP of the first TRP or the second TRP, or channel measurement resources (CMRs) associated with at least one of the first TRP or the second TRP. For example, the rank restriction or the CBSR may be configured for a particular TRP, for a particular type of CSI measurement (e.g., single-TRP measurement or multi-TRP measurement), or may be configured for a particular set or pair of CMRs. In block 204, the method 200 performs one or more CSI measurements based on the decoded CSI reporting configuration. For instance, the UE may perform measurements associated with the first TRP (i.e., single TRP measurements), the second TRP (i.e., single TRP measurements), and/or both TRPs (i.e., multi-TRP measurements).

The method 200 may further include the at least one codebook comprising a single codebook that applies to all CSI measurements. The method 200 may further include the at least one codebook comprising a first codebook configured for the first TRP and a second codebook configured for the second TRP. The method 200 may further include the at least one codebook comprising a first codebook configured for single-TRP measurements and a second codebook configured for multi-TRP measurements.

The method 200 may further include the rank restriction configuration comprising a first rank restriction configured for the first TRP and a second rank restriction configured for the second TRP. The method 200 may further include the rank restriction configuration comprising a first rank restriction configured for single-TRP measurements and a second rank restriction configured for multi-TRP measurements.

The method 200 may further include a first set of CMRs being configured for single-TRP measurements associated with the first TRP, a second set of CMRs being configured for single-TRP measurements associated with the second TRP, and a third set of CMRs being configured for multi-TRP measurements associated with both the first TRP and the second TRP. The method 200 may further include the rank restriction configuration comprising a first rank restriction configured for the first set of CMRs, a second rank restriction configured for the second set of CMRs, and a third rank restriction configured for the third set of CMRs.

The method 200 may further include the rank restriction configuration comprising a first rank restriction configured for single-TRP measurements and a second rank restriction configured for multi-TRP measurements. The first rank restriction may correspond to the first set of CMRs and the second set of CMRs, and the second rank restriction may correspond to the third set of CMRs.

The method 200 may further include a plurality of CMRs being configured for performing the one or more CSI measurements, wherein the rank restriction comprises a different rank restriction configured for each of the plurality of CMRs. The method 200 may further include the CBSR configuration comprising a first CBSR configured for the first TRP and a second CBSR configured for the second TRP. The method 200 may further include the CBSR configuration comprising a first CBSR configured for single-TRP measurements and a second CBSR configured for multi-TRP measurements.

The method 200 may further include a first set of CMRs being configured for single-TRP measurements associated with the first TRP, a second set of CMRs being configured for single-TRP measurements associated with the second TRP, and a third set of CMRs being configured for multi-TRP measurements associated with both the first TRP and the second TRP. The method 200 may further include the CBSR configuration comprising a first CBSR configured for the first set of CMRs, a second CBSR configured for the second set of CMRs, and a third CBSR configured for the third set of CMRs.

The method 200 may further include the CBSR configuration comprising a first CBSR configured for single-TRP measurements and a second CBSR configured for multi-TRP measurements. The first CBSR may correspond to the first set of CMRs and the second set of CMRs, and the second CBSR may correspond to the third set of CMRs. The method 200 may further include a plurality of CMRs being configured for performing the one or more CSI measurements, wherein the rank restriction comprises a different rank restriction configured for each of the plurality of CMRs.

Figure 3:
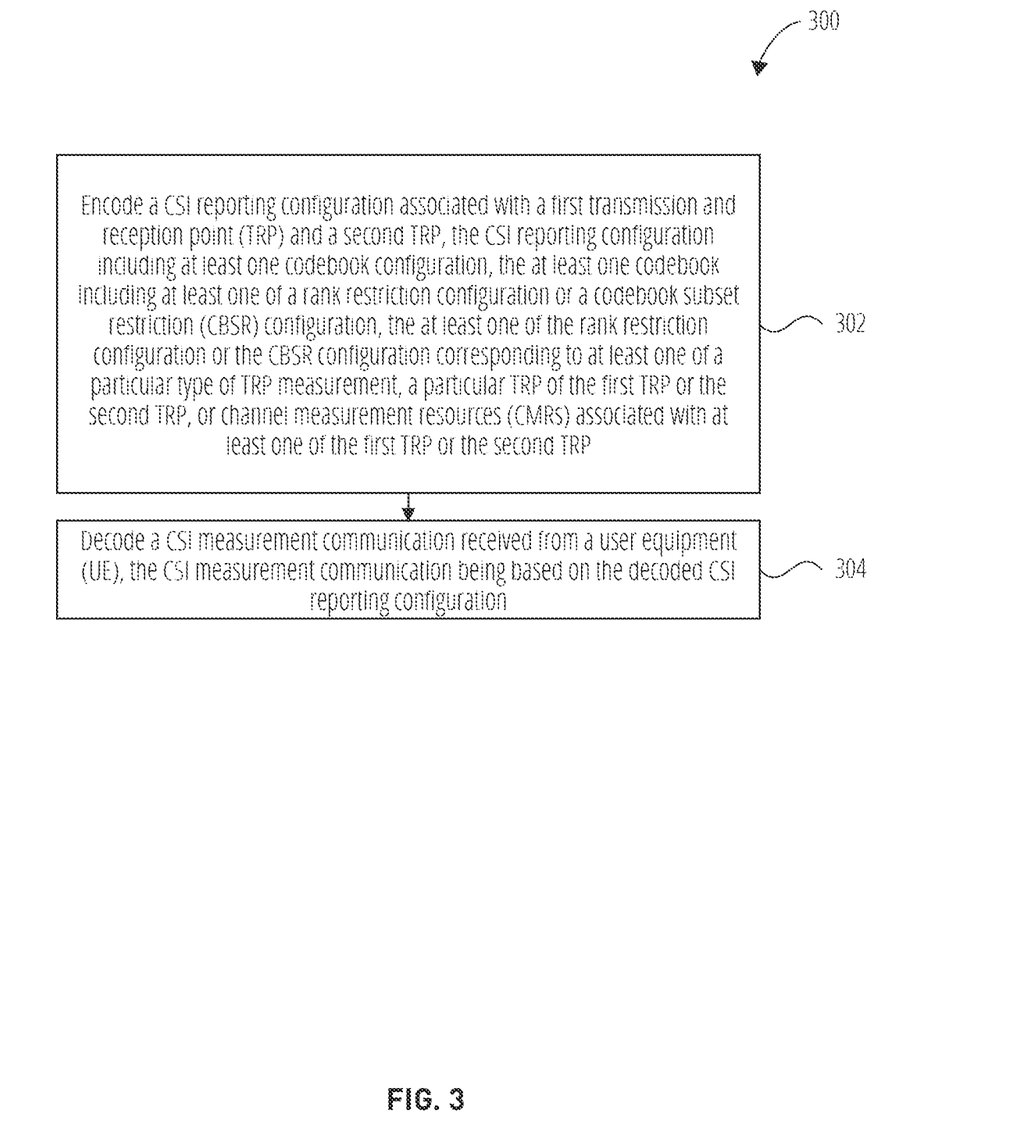
FIG. 3 illustrates a flowchart of a method for CSI reporting in accordance with one embodiment.

FIG. 3 illustrates a flowchart of a method 300 for enhanced CST reporting. In block 302, the method 300 encodes a CSI reporting configuration associated with a first transmission and reception point (TRP) and a second TRP. The CSI reporting configuration may include at least one codebook configuration. For instance, the codebook configuration may comprise CodebookConfig within CSI-ReportConfig. The at least one codebook may include at least one of a rank restriction configuration or a codebook subset restriction (CBSR) configuration.

The at least one of the rank restriction configuration or the CBSR configuration may correspond to at least one of a particular type of TRP measurement, a particular TRP of the first TRP or the second TRP, or channel measurement resources (CMRs) associated with at least one of the first TRP or the second TRP. For example, the rank restriction or the CBSR may be configured for a particular TRP, for a particular type of CST measurement (e.g., single-TRP measurement or multi-TRP measurement), or may be configured for a particular set or pair of CMRs. In block 304, the method 300 decodes a CSI measurement communication received from a user equipment (UE). The CSI measurement communication may be based on the decoded CSI reporting configuration. For instance, the base station may receive measurements. performed by the UE, associated with the first TRP (i.e., single TRP measurements), the second TRP (i.e., single TRP measurements), and/or both TRPs (i.e., multi-TRP measurements).

The method 300 may further include the at least one codebook comprising a single codebook that applies to all CSI measurements. The method 300 may further include the at least one codebook comprising a first codebook configured for the first TRP and a second codebook configured for the second TRP. The method 300 may further include the at least one codebook comprising a first codebook configured for single-TRP measurements and a second codebook configured for multi-TRP measurements.

The method 300 may further include the rank restriction configuration comprising a first rank restriction configured for the first TRP and a second rank restriction configured for the second TRP. The method 300 may further include the rank restriction configuration comprising a first rank restriction configured for single-TRP measurements and a second rank restriction configured for multi-TRP measurements.

The method 300 may further include a first set of CMRs being configured for single-TRP measurements associated with the first TRP, a second set of CMRs being configured for single-TRP measurements associated with the second TRP, and a third set of CMRs being configured for multi-TRP measurements associated with both the first TRP and the second TRP. The method 300 may further include the rank restriction configuration comprising a first rank restriction configured for the first set of CMRs, a second rank restriction configured for the second set of CMRs. and a third rank restriction configured for the third set of CMRs.

The method 300 may further include the rank restriction configuration comprising a first rank restriction configured for single-TRP measurements and a second rank restriction configured for multi-TRP measurements. The first rank restriction may correspond to the first set of CMRs and the second set of CMRs, and the second rank restriction may correspond to the third set of CMRs.

The method 300 may further include a plurality of CMRs being configured for performing one or more CSI measurements associated with the CSI measurement communication, wherein the rank restriction comprises a different rank restriction configured for each of the plurality of CMRs. The method 300 may further include the CBSR configuration comprising a first CBSR configured for the first TRP and a second CBSR configured for the second TRP. The method 300 may further include the CBSR configuration comprising a first CBSR configured for single-TRP measurements and a second CBSR configured for multi-TRP measurements.

The method 300 may further include a first set of CMRs being configured for single-TRP measurements associated with the first TRP, a second set of CMRs being configured for single-TRP measurements associated with the second TRP, and a third set of CMRs being configured for multi-TRP measurements associated with both the first TRP and the second TRP. The method 300 may further include the CBSR configuration comprising a first CBSR configured for the first set of CMRs, a second CBSR configured for the second set of CMRs, and a third CBSR configured for the third set of CMRs.

The method 300 may further include the CBSR configuration comprising a first CBSR configured for single-TRP measurements and a second CBSR configured for multi-TRP measurements. The first CBSR may correspond to the first set of CMRs and the second set of CMRs, and the second CBSR may correspond to the third set of CMRs. The method 300 may further include a plurality of CMRs being configured for performing one or more CSI measurements associated with the CSI measurement communication, wherein the rank restriction comprises a different rank restriction configured for each of the plurality of CMRs.

Embodiments contemplated herein include an apparatus comprising means to perform one or more elements of the method 300. This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the method 300. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a base station (such as a network device 618 that is a base station, as described herein).

Embodiments contemplated herein include a signal as described in or related to one or more elements of the method 300.

Embodiments contemplated herein include a computer program or computer program product comprising instructions, wherein execution of the program by a processing element is to cause the processing element to carry out one or more elements of the method 300. The processor may be a processor of a base station (such as a processor(s) 620 of a network device 618 that is a base station, as described herein). These instructions may be, for example, located in the processor and/or on a memory of the UE (such as a memory 622 of a network device 618 that is a base station, as described herein).

Figure 4:
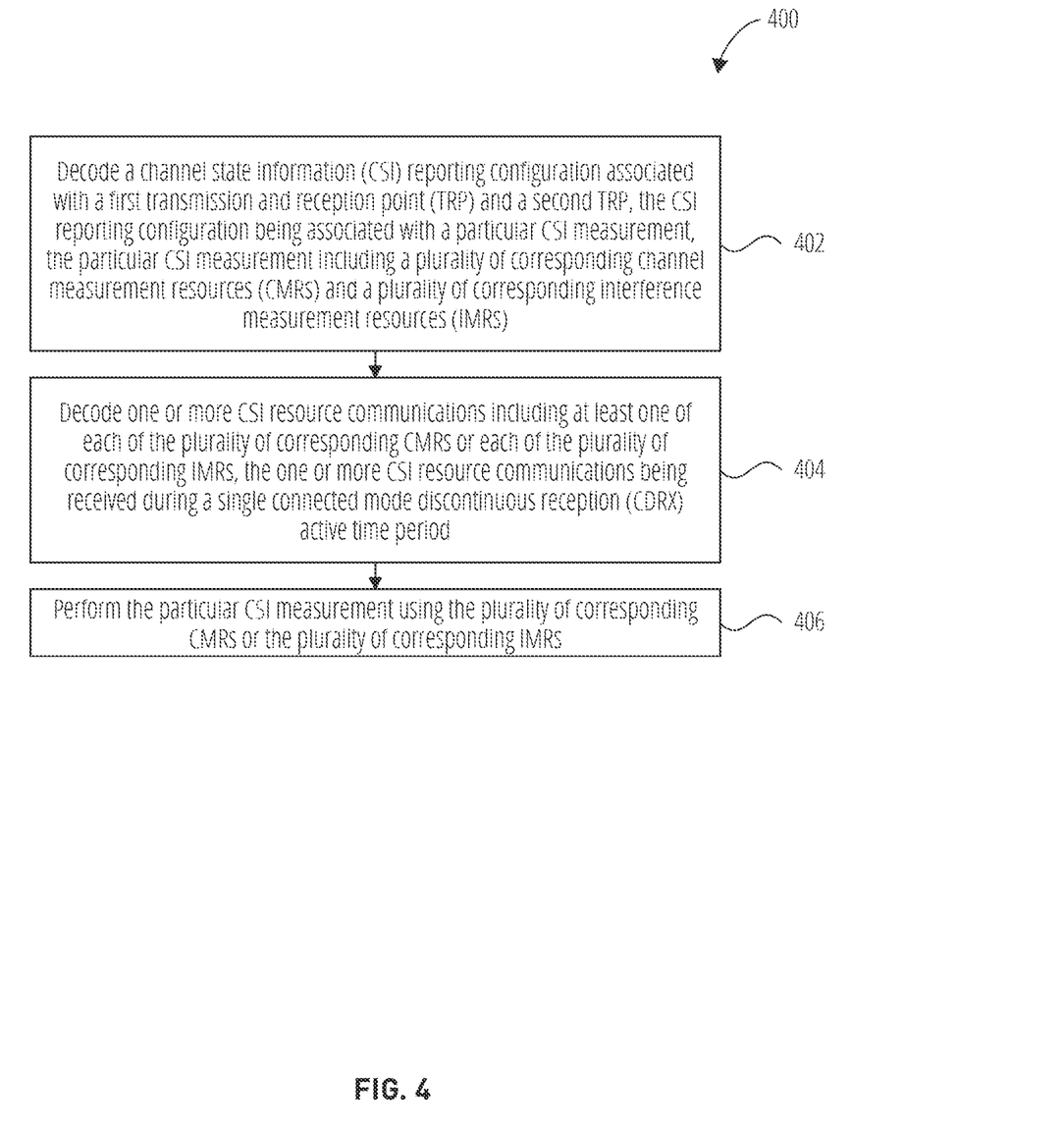
FIG. 4 illustrates a flowchart of a method for CSI reporting in accordance with one embodiment.

FIG. 4 illustrates a flowchart of a method 400 for enhanced CSI reporting. In block 402, the method 400 decodes a channel state information (CST) reporting configuration associated with a first transmission and reception point (TRP) and a second TRP. The CSI reporting configuration may be associated with a particular CSI measurement. The particular CSI measurement may include a plurality of corresponding channel measurement resources (CMRs) and a plurality of corresponding interference measurement resources (IMRs). For instance, CMR 102, CMR 104, IMR 106, and IMR 108 of FIG. 1 may correspond to a particular CSI measurement.

In block 404, the method 400 decodes one or more CSI resource communications including at least one of each of the plurality of corresponding CMRs or each of the plurality of corresponding IMRs. The one or more CSI resource communications may be received during a single connected mode discontinuous reception (CDRX) active time period. For instance, all the CMRs and/or IMRs may be received by the UE during the CDRX active time 110 of FIG. 1. In block 406, the method 400 performs the particular CSI measurement using the plurality of corresponding CMRs or the plurality of corresponding IMRs. For instance, the UE may use the CMR 102, CMR 104, IMR 106, and IMR 108 of FIG. 1 to perform the particular CSI measurement.

The method 400 may further include encoding a UE capability communication for transmission to a base station. The UE capability communication may include a requirement to receive at least one of each of the plurality of corresponding CMRs or each of the plurality of corresponding IMRs in a same CDRX active time. The method 400 may also include the UE capability communication further including a minimum CST reporting processing timeline corresponding to capabilities of the UE.

Embodiments contemplated herein include an apparatus comprising means to perform one or more elements of the method 200 and the method 400. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 200 and the method 400. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 200 and the method 400. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 200 and the method 400. This apparatus may be, for example, an apparatus of a UE (such as a wireless device 602 that is a UE, as described herein).

Embodiments contemplated herein include a signal as described in or related to one or more elements of the method 200 and the method 400.

Embodiments contemplated herein include a computer program or computer program product comprising instructions, wherein execution of the program by a processor is to cause the processor to carry out one or more elements of the method 200 and the method 400. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Figure 5:
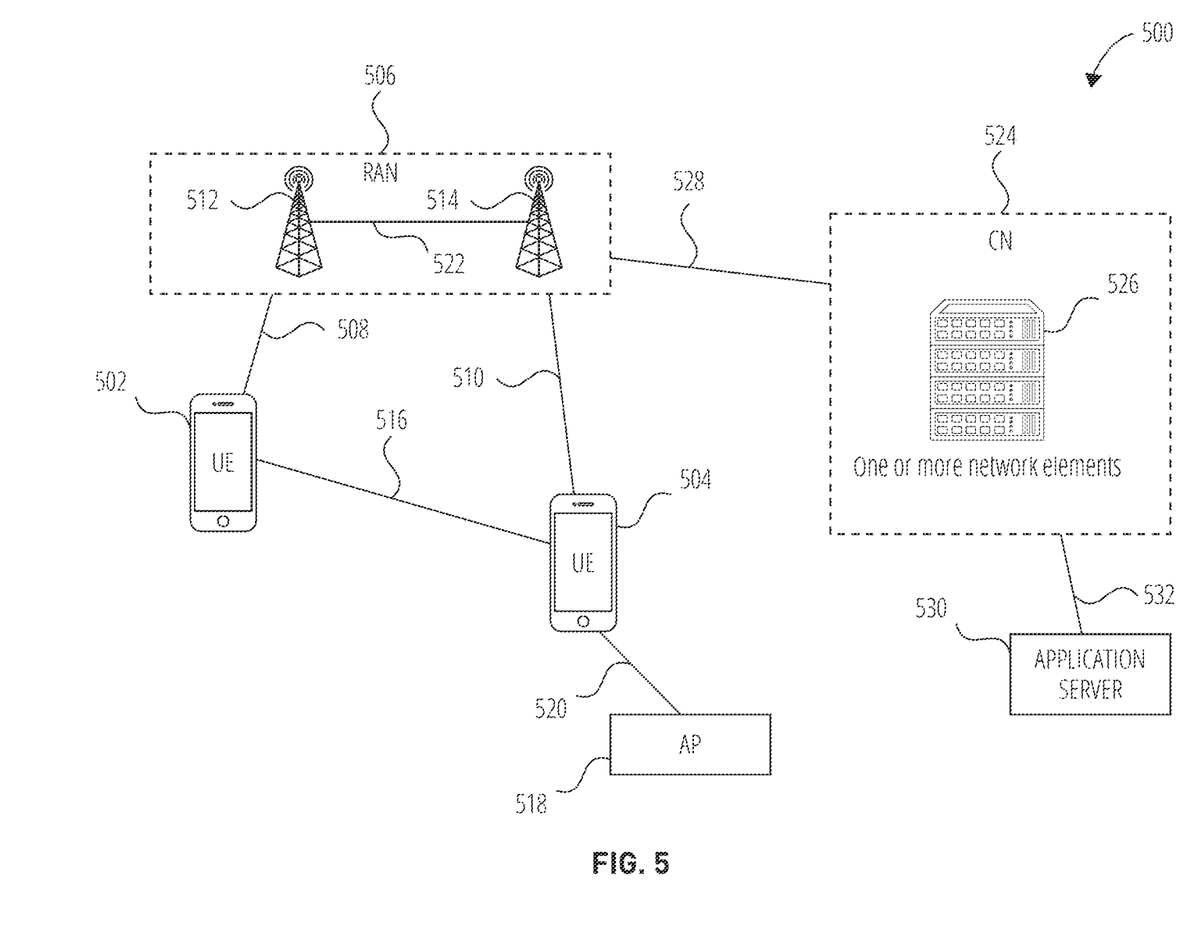
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
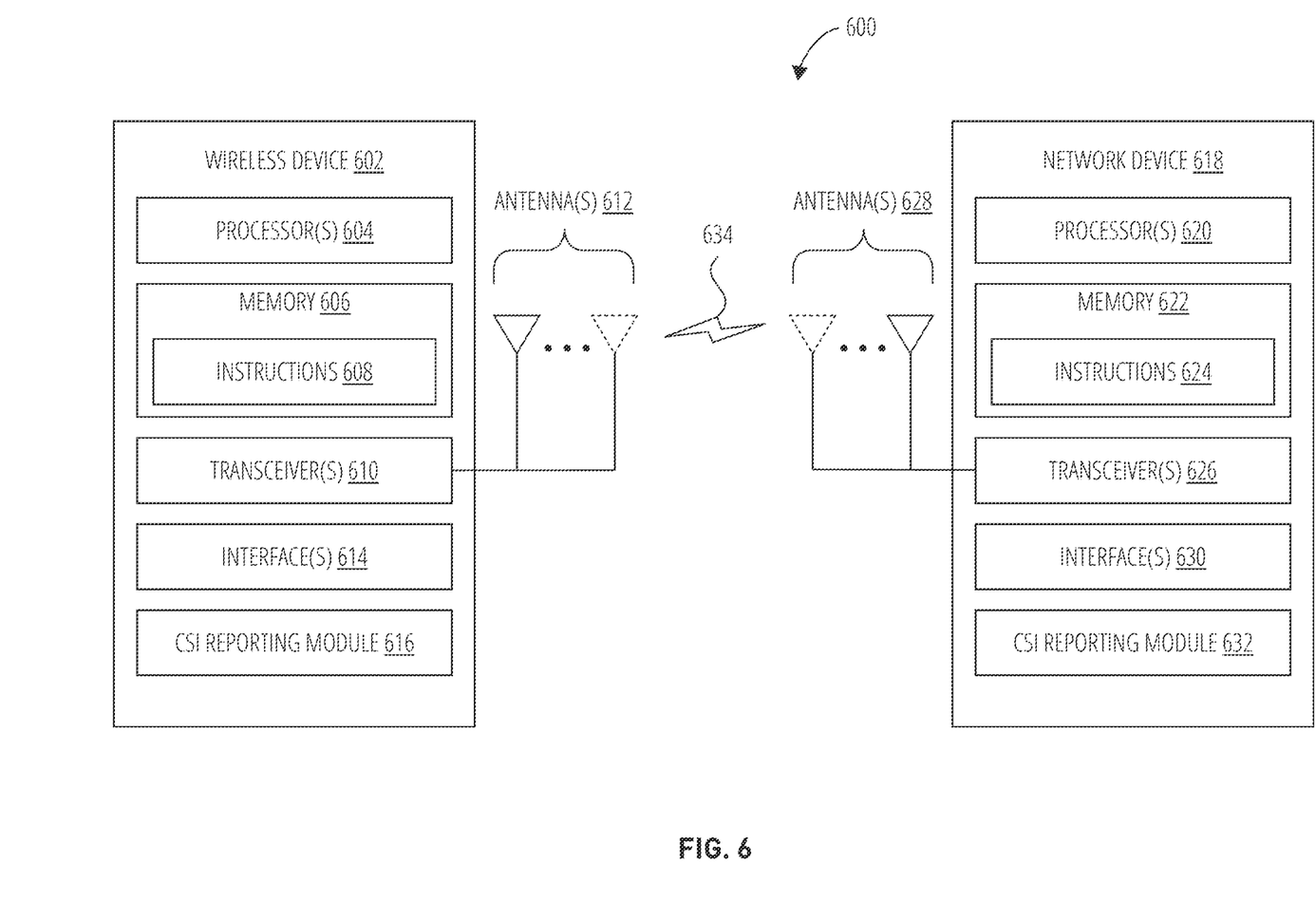
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a CSI reporting module 616. The CSI reporting module 616 may be implemented via hardware, software, or combinations thereof. For example, the CSI reporting module 616 may be implemented as a processor, circuit, and/or instructions 608 stored in the memory 606 and executed by the processor(s) 604. In some examples, the CSI reporting module 616 may be integrated within the processor(s) 604 and/or the transceiver(s) 610. For example, the CSI reporting module 616 may be implemented by a combination of software components (e.g., executed by a DSP or a general processor) and hardware components (e.g., logic gates and circuitry) within the processor(s) 604 or the transceiver(s) 610.

The CSI reporting module 616 may be used for various aspects of the present disclosure, for example, aspects of FIG. 1 through FIG. 4. The CSI reporting module 616 is configured to perform enhanced CSI reporting procedures as further described herein.

The network device 618 may include one or more processor(s) 620. The processor(s) 620 may execute instructions such that various operations of the network device 618 are performed, as described herein. The processor(s) 604 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a CSI reporting module 632. The CSI reporting module 632 may be implemented via hardware, software, or combinations thereof. For example, the CSI reporting module 632 may be implemented as a processor, circuit, and/or instructions 624 stored in the memory 622 and executed by the processor(s) 620. In some examples, the CSI reporting module 632 may be integrated within the processor(s) 620 and/or the transceiver(s) 626. For example, the CSI reporting module 632 may be implemented by a combination of software components (e.g., executed by a DSP or a general processor) and hardware components (e.g., logic gates and circuitry) within the processor(s) 620 or the transceiver(s) 626.

The CSI reporting module 632 may be used for various aspects of the present disclosure, for example, aspects of FIG. 1 through FIG. 4. The CSI reporting module 632 is configured to assist in performing enhanced CSI reporting procedures as further described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) comprising:
a processor; and
a memory storing instructions that, when executed by the processor, configure the UE to:
decode a channel state information (CSI) reporting configuration associated with a first transmission and reception point (TRP) and a second TRP, the CSI reporting configuration including at least one codebook configuration, the at least one codebook including at least one of a rank restriction configuration or a codebook subset restriction (CBSR) configuration, the at least one of the rank restriction configuration or the CBSR configuration corresponding to at least one of a particular type of TRP measurement, a particular TRP of the first TRP or the second TRP, or channel measurement resources (CMRs) associated with at least one of the first TRP or the second TRP;
wherein a first set of CMRs are configured for single-TRP measurements associated with the first TRP, a second set of CMRs are configured for single-TRP measurements associated with the second TRP, and a third set of CMRs are configured for multi-TRP measurements associated with both the first TRP and the second TRP; and
perform one or more CSI measurements based on the CSI reporting configuration.

2. The UE of claim 1, wherein the at least one codebook comprises a single codebook that applies to all CSI measurements.

3. The UE of claim 1, wherein the at least one codebook comprises a first codebook configured for the first TRP and a second codebook configured for the second TRP.

4. The UE of claim 1, wherein the at least one codebook comprises a first codebook configured for single-TRP measurements and a second codebook configured for multi-TRP measurements.

5. The UE of claim 1, wherein the rank restriction configuration comprises a first rank restriction configured for the first TRP and a second rank restriction configured for the second TRP.

6. The UE of claim 1, wherein the rank restriction configuration comprises a first rank restriction configured for single-TRP measurements and a second rank restriction configured for multi-TRP measurements.

7. The UE of claim 1, wherein the rank restriction configuration comprises a first rank restriction configured for the first set of CMRs, a second rank restriction configured for the second set of CMRs, and a third rank restriction configured for the third set of CMRs.

8. The UE of claim 1, wherein the rank restriction configuration comprises a first rank restriction configured for single-TRP measurements and a second rank restriction configured for multi-TRP measurements, the first rank restriction corresponding to the first set of CMRs and the second set of CMRs, and the second rank restriction corresponding to the third set of CMRs.

9. The UE of claim 1, wherein a plurality of CMRs are configured for performing the one or more CSI measurements, wherein the rank restriction comprises a different rank restriction configured for each of the plurality of CMRs.

10. A method at a base station for enhanced channel state information (CSI) reporting, the method comprising:
encoding a CSI reporting configuration associated with a first transmission and reception point (TRP) and a second TRP, the CSI reporting configuration including at least one codebook configuration, the at least one codebook including at least one of a rank restriction configuration or a codebook subset restriction (CBSR) configuration, the at least one of the rank restriction configuration or the CBSR configuration corresponding to at least one of a particular type of TRP measurement, a particular TRP of the first TRP or the second TRP, or channel measurement resources (CMRs) associated with at least one of the first TRP or the second TRP;
wherein a first set of CMRs are configured for single-TRP measurements associated with the first TRP, a second set of CMRs are configured for single-TRP measurements associated with the second TRP, and a third set of CMRs are configured for multi-TRP measurements associated with both the first TRP and the second TRP; and
decoding a CSI measurement communication received from a user equipment (UE), the CSI measurement communication being based on the CSI reporting configuration.

11. The method of claim 10, wherein the CBSR configuration comprises a first CBSR configured for the first TRP and a second CBSR configured for the second TRP.

12. The method of claim 10, wherein the CBSR configuration comprises a first CBSR configured for single-TRP measurements and a second CBSR configured for multi-TRP measurements.

13. The method of claim 10, wherein the CBSR configuration comprises a first CBSR configured for the first set of CMRs, a second CBSR configured for the second set of CMRs, and a third CBSR configured for the third set of CMRs.

14. The method of claim 10, wherein the CBSR configuration comprises a first CBSR configured for single-TRP measurements and a second CBSR configured for multi-TRP measurements, the first CBSR corresponding to the first set of CMRs and the second set of CMRs, and the second CBSR corresponding to the third set of CMRs.

15. The method of claim 10, wherein a plurality of CMRs are configured for performing one or more CSI measurements associated with the CSI measurement communication, wherein the rank restriction comprises a different rank restriction configured for each of the plurality of CMRs.

16. A method at a user equipment (UE) for enhanced channel state information (CSI) reporting, the method comprising:
decoding a channel state information (CSI) reporting configuration associated with a first transmission and reception point (TRP) and a second TRP, the CSI reporting configuration being associated with a particular CSI measurement, the particular CSI measurement including a plurality of corresponding channel measurement resources (CMRs) and a plurality of corresponding interference measurement resources (IMRs);
decoding one or more CSI resource communications including at least one of each of the plurality of corresponding CMRs or each of the plurality of corresponding IMRs, the one or more CSI resource communications being received during a single connected mode discontinuous reception (CDRX) active time period; and
performing the particular CSI measurement using the plurality of corresponding CMRs or the plurality of corresponding IMRs.

17. The method of claim 16, further comprising encoding a UE capability communication for transmission to a base station, the UE capability communication including a requirement to receive at least one of each of the plurality of corresponding CMRs or each of the plurality of corresponding IMRs in a same CDRX active time.

18. The method of claim 16, wherein the UE capability communication further includes a minimum CSI reporting processing timeline corresponding to capabilities of the UE.

19. The method of claim 10, wherein the at least one codebook comprises a single codebook that applies to all CSI measurements.

20. The method of claim 10, wherein the at least one codebook comprises a first codebook configured for the first TRP and a second codebook configured for the second TRP.

* * * * *